United States Patent
Saito et al.

(10) Patent No.: US 7,515,383 B2
(45) Date of Patent: Apr. 7, 2009

(54) MAGNETIC RECORDING MEDIUM

(75) Inventors: Shinji Saito, Odawara (JP); Hitoshi Noguchi, Odawara (JP); Nobuo Yamazaki, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 371 days.

(21) Appl. No.: 11/237,973

(22) Filed: Sep. 29, 2005

(65) Prior Publication Data

US 2006/0024533 A1   Feb. 2, 2006

Related U.S. Application Data

(63) Continuation of application No. 10/762,506, filed on Jan. 23, 2004, now abandoned.

(30) Foreign Application Priority Data

Jan. 24, 2003   (JP)   .............................. 2003-015601

(51) Int. Cl.
*G11B 5/02* (2006.01)
*G11B 5/48* (2006.01)
*G11B 5/714* (2006.01)

(52) U.S. Cl. ..................... 360/131; 428/842; 428/842.8
(58) Field of Classification Search ....................... None
See application file for complete search history.

(56) References Cited

U.S. PATENT DOCUMENTS

| 5,384,175 | A | 1/1995 | Kojima et al. |
| 6,291,052 | B1 | 9/2001 | Takahashi et al. |
| 6,312,796 | B1 | 11/2001 | Zinbo |
| 6,727,009 | B2 | 4/2004 | Masaki et al. |

FOREIGN PATENT DOCUMENTS

| EP | 1 168 309 A1 | 6/2001 |
| JP | 5-109061 A | 4/1993 |
| JP | 5-182178 A | 7/1993 |

*Primary Examiner*—Kevin M Bernatz
(74) *Attorney, Agent, or Firm*—Sughrue Mion, PLLC

(57) ABSTRACT

Provided is a magnetic recording medium exhibiting good electromagnetic characteristics in high-density recording The magnetic recording medium employed for magnetically recording signals with a track width equal to or less than 2.0 μm and reproducing the magnetically recorded signals, wherein said magnetic recording medium comprises a magnetic layer comprising a hexagonal ferrite ferromagnetic powder and a binder or comprises a nonmagnetic layer comprise a nonmagnetic powder and a binder and a magnetic layer comprising a hexagonal ferrite ferromagnetic powder and a binder in this order on a nonmagnetic support. Said magnetic layer has a thickness equal to or less than 0.2 μm, and said hexagonal ferrite ferromagnetic powder has an average plate diameter being ⅟₃₀ or less of the magnetically recorded track width as well as ½ or less of the thickness of the magnetic layer.

16 Claims, No Drawings

MAGNETIC RECORDING MEDIUM

This is a continuation of application Ser. No. 10/762,506, filed Jan. 23, 2004 now abandoned.

FIELD OF THE INVENTION

The present invention relates to a particulate magnetic recording medium with high recording density. In particular, the present invention relates to a magnetic recording medium for high-density record comprising a hexagonal ferrite ferromagnetic powder in a magnetic layer.

BACKGROUND OF THE INVENTION

In the field of magnetic recording disks, 2 MB MF-2HD floppy disk employing Co-modified iron oxide have been mounted normally in personal computers. However, today, with the rapid increase in the volume of data handled, the capacity of such disks is inadequate and there is a need for the development of high-capacity floppy disks.

On the other hand, in the field of magnetic tapes, with the widespread popularity of office computers such as minicomputers, personal computers, and work stations in recent years, a large amount of research has been conducted into magnetic recording tapes (so-called "back-up tape") used to record computer data as an external memory medium. In the practical implementation of magnetic recording tapes for such applications, particularly as the size of computers has decreased and information processing capability has increased, there had been strong demand for an increase in recording capacity to achieve high-capacity recording and size reduction.

Further, with the broadening of the environments in which magnetic tapes are employed, magnetic tapes have been fiber required to have usability under a wide range of conditions particularly conditions in which beat and humidity severely fluctuate), reliability of data storage, and reliability of performance such as stable recording and reproducing of data when used repeatedly at high speed with high running frequency.

In recent years, the magnetic tapes employed in digital recording systems have been determined by system. There are magnetic tapes corresponding to so called models DLT, 3480, 3490, 3590, QIC, model D8, and model DDS. In the magnetic tape employed in any system, a nonmagnetic support is provided on one side with a single-layer-structure magnetic layer with a relatively thick film thickness of about 2.0 to 3.0 μm comprising a ferromagnetic powder, binder, and abrasives, and on the other side with a backcoat layer to prevent winding irregularity and ensure good running durability. However, these comparatively thick, single-layer-structure magnetic layers have a problem in the form of thickness loss, where output drops of The technique of thinning the magnetic layer is known to afford improvement with respect to the drop in reproduction output caused by thickness loss of the magnetic layer. For example, a tape-shaped magnetic recording medium (Japanese Unexamined Patent Publication (KOKAI) Heisei No. 5-182178 has been disclosed in which on a nonmagnetic support is provided a lower nonmagnetic layer comprising an inorganic powder dispersed in a binder, on which is formed, while the nonmagnetic layer is still wet, an upper magnetic layer equal to or less than 1.0 μm in thickness comprising ferromagnetic metal powder dispersed in binder. Further, a disk-shaped magnetic recording medium having a magnetic layer with a coercive force (Hc) of equal to or greater than 111 kA/m (1,400 Oe) and a thickness of 0.5 μm; and a nonmagnetic layer comprising electrically conductive particles has been disclosed (Japanese Unexamined Patent Publication (KOKAI) Heisei 5-109061).

However, with the rapid development of high-capacity and high-density disk and tape-shaped magnetic recording media in recent years, it has become difficult to achieve sufficient electromagnetic characteristics, even with the above-described techniques. In particular, when recording and reproducing are performed at a recording density of Gbit/in$^2$ is or higher with increased linear recoding density and track density, it is difficult to achieve adequate electromagnetic characteristics with conventional magnetic recording media.

The present invention was devised in light of the above problems. It is an object of the present invention to provide a magnetic recording medium exhibiting good electromagnetic characteristics in high-density recording.

The present inventors conducted extensive research into obtaining a magnetic recording medium affording good electromagnetic characteristics even in high-density recording of Gbit/in$^2$ class or higher on narrow tracks. As a result, they discovered that in a magnetic recording medium employing a hexagonal ferrite ferromagnetic powder, by adjusting the average plate diameter of the hexagonal ferrite ferromagnetic powder based on the recording track width and magnetic layer thickness, it was possible to obtain a magnetic recording medium having good electromagnetic characteristics even at high density; the present invention was devised on that basis.

That is, the object of the present invention is achieved by a magnetic recording media (1) and (2) below:

(1) a magnetic recording medium employed for magnetically recording signals with a track width equal to or less than 2.0 μm and reproducing the magnetically recorded signals, wherein said magnetic recording medium comprises a magnetic layer comprising a hexagonal ferrite ferromagnetic powder and a binder on a nonmagnetic support, said magnetic layer has a thickness equal to or less than 0.2 μm, and said hexagonal ferrite ferromagnetic powder has an average plate diameter being $\frac{1}{30}$ or less of the magnetically recorded track width as well as $\frac{1}{2}$ or less of the thickness of the magnetic layer;

(2) a magnetic recording medium employed for magnetically recording signals with a track width equal to or less than 2.0 μm and reproducing the magnetically recorded signals, wherein said magnetic recording medium comprises a nonmagnetic layer comprising a nonmagnetic powder and a binder and a magnetic layer comprising a hexagonal ferrite ferromagnetic powder and a binder in this order on a nonmagnetic support, said magnetic layer has a thickness equal to or less than 0.2 μm, and said hexagonal ferrite ferromagnetic powder has an average plate diameter being $\frac{1}{30}$ or less of the magnetically recorded track width as well as $\frac{1}{2}$ or less of the thickness of the magnetic layer;

In the above magnetic recording media, it is preferred that a bit length of the magnetically recorded signal ranges from 0.04 to 0.2 μm;

the magnetic layer has a coercive fore ranging from 143 to 398 kA/m (1800 to 5000 Oe); and the magnetic layer has a squareness (SQ) equal to or higher than 0.6.

It is further preferred that the magnetic recording media are for the use in the magnetic recording and reproducing system wherein a signal magnetically recorded on the magnetic layer is reproduced with a magnetoresistive head (MR head).

Modes of implementing the magnetic recording medium of the present invention will be described in detail below.

[Recording Track Width]

The magnetic recording medium of the present invention is employed to magnetically record signals at a track width equal to or less than 2.0 μm and to reproduce the magnetically recorded signals.

To achieve magnetic recording at a high density of Gbit/in$^2$ class or higher, it is necessary to increase the track density and the linear recording density. Thus, it is desirable to make the recording track width as small as possible. However, when the recording track width is reduced in conventional magnetic recording media, there is a problem in that adequate electromagnetic characteristics (S/N ratio) are not achieved. The present invention is a magnetic recording medium achieving good electromagnetic characteristics even when reproducing signals that have been magnetically recorded at a narrow track width of 2.0 μm or less.

In the present invention, the recording track width is, as stated above, equal to or less than 2.0 μm, preferably in the range of 0.5 to 1.5 μm. A recording track width being equal to or greater than 0.5 μm is desirable in that tracking can be adequately performed even with existing techniques.

In this Specification, the phrases "magnetically recorded track width" and "recording track width" are synonymous, meaning the width of a single track on which gals are recorded with a recording head. The reproduction track width with a reproduction head is generally narrower than this, commonly being about 50 to 95 percent of the track width. The track pitch is broader than this, usually being about 105 to 140 percent of the recording track width.

The linear recording density during magnetic recording is not specifically limited in the present invention. The recording bit length is preferably 40 to 200 nm/bit, more preferably 60 to 120 nm/bit. A recording bit length of equal to or greater than 40 nm/bit is desirable in that space loss tends not to have an effect, and since the size of the plate thickness of the hexagonal ferrite ferromagnetic powder is small relative to the bit length, little transition noise is generated and a good S/N ratio is achieved. The recording bit length is preferably equal to or less than 200 nm/bit to achieve the desired recording density.

[Hexagonal Ferrite Ferromagnetic Powder]

In the present invention, a hexagonal ferrite ferromagnetic powder is employed as a ferromagnetic powder in the magnetic layer. Examples of hexagonal ferrite ferromagnetic powders are various substitution products of barium ferrite, strontium ferrite, lead ferrite, and calcium ferrite, and Co substitution products.

Specific examples are magnetoplumbite-type barium ferrite and strontium ferrite; magnetoplumbite ferrite in which the particle surfaces are covered with spinels; and magnetoplumbite-type barium ferrite, strontium ferrite, and the like pa comprising a spinel phase. The following may be incorporated in addition to the prescribed atoms: Al, Si, S, Sc, Ti, V, Cr, Cu Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge, Nb, and the like. Compounds to which elements such as Co—Zn, Co—Ti, Co—Ti—Zr, Co—Ti—Zn, Ni—Ti—Zn, Nb—Zn—Co, Sb—Zn—Co, and Nb—Zn have been added may generally also be employed. They may comprise specific impurities depending on the starting materials and manufacturing methods, but those can also be employed in the present invention.

In the present invention, the average plate diameter of the hexagonal ferrite ferromagnetic powder is $1/30$ or less of the recording track width, and $1/2$ or less of thickness of the magnetic layer.

When the recording track width is equal to or less than 2.0 μm, nonuniformity in magnetization at both ends of the reproduction track due to the plate diameter of the hexagonal ferrite magnetic material is relatively no longer negligible. For example, if considering the case where hexagonal ferrite ferromagnetic powders of plate diameter A are disposed in a magnetic layer of thickness A, there is one magnetic powder particle in the thickness direction of the magnetic layer. Therefore, it will be readily understood that uniform film formation in the direction of thickness of the magnetic layer and uniform magnetic recording are difficult.

On the other hand, when conducting high-density recording, it is necessary to thin the magnetic layer to reduce adjacent waveform interference. However, when the magnetic layer is thinned, the S/N ratio ends up dropping abruptly.

The present inventors conducted extensive research into the above-stated problems, resulting in the discovery of a significant relation between the plate diameter of the hexagonal ferrite and the thickness of the magnetic layer. That is, the present inventors assumed that in magnetic recording media for in-plane recording, since there is a large amount of plate-shaped hexagonal ferrite ferromagnetic powders arranged in a longitudinal direction and thus the number of hexagonal ferrite ferromagnetic powders arranged in the thickness direction is limited in a thin magnetic layer, uniformity in the magnetic layer deteriorates in the thickness direction, resulting in noise increase.

Accordingly, the present inventors, based on this examination, conducted further extensive research into the relation between the average plate diameter of the hexagonal ferrite ferromagnetic powder employed and the magnetic layer thickness, resulting in the discovery that by limiting the average plate diameter of the hexagonal ferrite ferromagnetic powder to $1/30$ or lees of the recording track width and adjuring it to $1/2$ or less of the thickness of the magnetic layer, it was possible to adequately reduce the width of the magnetic material relative to the magnetic layer, nonuniformity in magnetization at both ends of the track tended not to occur, and noise was reduced.

The average plate diameter of the hexagonal ferrite ferromagnetic powder employed in the present invention is not limited so long as it is within the above-stated range, but is preferably from 10 to 50 nm, more preferably from 15 to 30 nm. The average plate diameter is preferably $1/40$ or less, more preferably $1/50$ or less of the recording track width, as well as preferably $1/3$ or less, more preferably $1/4$ or less of the thickness of the magnetic layer. Further, the lower limit of the average plate diameter is preferably $1/150$ of the recording track width as well as $1/15$ of the thickness of the magnetic layer. Further, the average plate thickness is preferably from 5 to 15 nm, more preferably from 7 to 12 nm. An average plate diameter equal to or greater than 10 nm and an average plate thickness equal to or greater than 5 nm are desirable because magnetic anisotropy can be maintained and good coercive force (Hc) and thermal stability can be achieved.

The plate ratio (plate diameter/plate thickness) of the hexagonal ferrite ferromagnetic powder is preferably 2 to 5, more preferably 2.5 to 4. A low plate ratio is desirable because the fill rate in the magnetic layer increases; however, adequate orientation cannot be achieved. An excessively high plate ratio is undesirable because noise increases due to stacking of particles. From these perspectives, the plate ratio preferably falls within a raw of 2 to 5.

The specific surface area by BET method of the hexagonal ferrite ferromagnetic powder is usually 20 to 200 m²/g, almost corresponding to an arithmetic value from the particle plate diameter and the plate thickness. Narrow distributions of particle plate diameter and plate thickness are normally preferred. These can be compared by randomly measuring 500 particles in a TEM photograph of particles. The distributions are often not a normal distribution. However, when expressed as the standard deviation to the average size, σ/average size=0.1 to 2.0. The particle producing reaction system is rendered as uniform as possible and the particles produced are subjected to a distribution-enhancing treatment to achieve a sharp particle size distribution. For example, methods such as selectively dissolving ultrafine particles in an acid solution are known.

The coercive force (Hc) of the hexagonal ferrite ferromagnetic powder is preferably from 143 to 398 kA/m (1,800 to 5,000 Oe), more preferably from 167 to 279 kA/m (2,100 to 3,500 Oe). When the coercive force (Hc) is equal to or greater than 143 kA/m, there tends to be no demagnetization during recording and no drop in output. At equal to or less than 398 kA/m, recording with head is possible and output is maintained. The coercive force (Hc) can be controlled by means of the particle size elate diameter and plate thickness), the type and quantities of elements incorporated, the substitution sites of the elements, the particle generating reaction conditions, and the like.

The saturation magnetization (σs) of the hexagonal ferrite ferromagnetic powder is preferably 40 to 80 A·m²/kg (40 to 80 emu/g). The higher saturation magnetization (σs) is preferred, however, it tends to decrease with decreasing particle size. Known methods of improving saturation magnetization (σs) are combining spinel ferrite with magnetoplumbite ferrite, selection of the type and quantity of elements incorporated, and the like. It is also possible to employ W-type hexagonal ferrite. When dispersing the ferromagnetic powder, the surface of the ferromagnetic powder particles may be processed with a substance suited to a dispersion medium and a polymer. Both organic and inorganic compounds can be employed as surface treatment agents. Examples of the principal compounds are oxides and hydroxides of Si, Al, P, and the like; various silane coupling agents; and various titanium coupling agents. The quantity of surface treatment agent added may range from 0.1 to 10 weight percent relative to the weight of the ferromagnetic powder. The pH of the ferromagnetic powder is also important to dispersion. A pH of about 4 to 12 is usually optimum for the dispersion medium and polymer. From the perspective of the chemical stability and storage properties of the medium, a pH of about 6 to 11 can be selected. Moisture contained in the ferromagnetic powder also affects dispersion. There is an optimum level for the dispersion medium and polymer, usually selected from the range of 0.01 to 2.0 percent.

The hexagonal ferrite ferromagnetic powder may be surface treated as necessary with Al, Si, P, an oxide thereof or the like. The quantity employed desirably ranges from 0.1 to 10 weight percent of the ferromagnetic powder, and when a surface treatment is conducted, a lubricant such as a fatty acid is desirably adsorbed in a quantity of equal to or less than 100 mg/m². An inorganic ion in the form of soluble Na, Ca, Fe, Ni, Br, or the like may be contained in the hexagonal ferrite ferromagnetic powder. These are preferably substantially not contained, but at levels of equal to or less than 200 ppm, characteristics are seldom affected.

Methods of manufacturing the hexagonal ferrite ferromagnetic powder include; (1) a vitrified crystallization method consisting of mixing into a desired ferrite composition barium oxide, iron oxide, and a metal oxide substituting for iron with a glass forming substance such as boron oxide; melting the mixture; rapidly cooling the mixture to obtain an amorphous material; reheating the amorphous material; and refining and comminuting the product to obtain a barium ferrite crystal powder; (2) a hydrothermal reaction method connoting of neutral a barium ferrite composition metal salt solution with an alkali; removing the by-product; heating the liquid phase to 100° C. or greater; and wig, drying, and comminuting the product to obtain barium ferrite crystal powder; and (3) a coprecipitation method consisting of neutralizing a barium ferrite composition metal salt solution with an alkali; removing the by-product; drying the product and processing it at equal to or lose than 1,100° C.; and commuting the product to obtain barium ferrite crystal powder. However, any manufacturing method can be selected in the present invention.

[Nonmagnetic Power]

The magnetic recording medium of the present invention can comprise a nonmagnetic layer between a nonmagnetic support and a magnetic layer. The preferred nonmagnetic layers are those comprising an inorganic nonmagnetic powder and a binder as main components. The inorganic nonmagnetic powder employed in the nonmagnetic layer can be selected from inorganic compounds such as metal oxides, metal carbonates, metal sulfates, metal nitrides, metal carbides, metal sulfides and the like. Examples of inorganic compounds are α-alumina having an α-conversion rate equal to or higher than 90 percent, β-alumina, γ-alumina, θ-alumina, silicon carbide, chromium oxide, cerium oxide, α-iron oxide, hematite, goethite, corundum, silicon nitride, titanium carbide, titanium dioxide, silicon dioxide, tin oxide, magnesium oxide, tungsten oxide, zirconium oxide, boron nitride, zinc oxide, calcium carbonate, calcium sulfate, barium sulfite, and molybdenum disulfide; these may be employed singly or in combination. Particularly desirable due to their narrow particle distribution and numerous means of imparting functions are titanium dioxide, zinc oxide, iron oxide and barium sulfate. Even more preferred are titanium dioxide and α-iron oxide.

The particle size of these nonmagnetic powders preferably ranges from 0.005 to 2 μm, but nonmagnetic powders of differing particle size may be combined as needed, or the particle diameter distribution of a single nonmagnetic powder may be broadened to achieve the same effect. What is preferred most is a particle size in the nonmagnetic powder ranging from 0.01 to 0.2 μm. Particularly when the nonmagnetic powder is a granular metal oxide, an average particle diameter equal to or less than 0.08 μm is preferred, and when an acicular metal oxide, the major axis length is preferably equal to or less than 0.3 μm, more preferably equal to or less than 0.2 μm.

The tap density of the nonmagnetic powder preferably ranges from 0.05 to 2 g/ml more preferably from 0.2 to 1.5 g/ml. The moisture content of the nonmagnetic powder preferably ranges from 0.1 to 5 weight percent, more preferably from 0.2 to 3 weight percent, further preferably from 0.3 to 1.5 weight percent. The pH of the nonmagnetic powder preferably ranges from 2 to 11, and the pH between 5.5 to 10 is particular preferred. The specific surface area of the nonmagnetic powder preferably ranges from 1 to 100 m²/g, more preferably from 5 to 80 m²/g, further preferably from 10 to 70 m²/g. The crystallite size of the nonmagnetic powder preferably ranges from 0.004 to 1 μm, further preferably from 0.04 to 0.1 μm. The oil absorption capacity using dibutyl phthalate (DBP) preferably ranges from 5 to 100 ml/100 g, more preferably from 10 to 80 ml/g, further preferably from 20 to 60 ml/100 g. The specific gravity of the nonmagnetic powder preferably ranges from 1 to 12, more preferably from 3 to 6.

The shape of the nonmagnetic powder may be any of acicular, spherical, polyhedral, or plate-shaped. The Mohs' hardness is preferably 4 to 10. The stearic acid (SA) adsorption capacity of the nonmagnetic powders preferably ranges from 1 to 20 µmol/m$^2$, more preferably from 2 to 15 µmol/m$^2$, further preferably from 3 to 8 µmol/m$^2$. The pH between 3 to 6 is preferred. The surface of these nonmagnetic powders is preferably treated with $Al_2O_3$, $SiO_2$, $TiO_2$, $ZrO_2$, $SnO_2$, $Sb_2O_3$, ZnO and $Y_3O_3$. The surface-treating agents of preference with regard to dispersibility are $Al_2O_3$, $SiO_2$, $TiO_2$, and $ZrO_2$, and $Al_2O_3$, $SiO_2$ and $ZrO_2$ are further preferable. These may be used singly or in combination. Depending on the objective, a surface-treatment coating layer with a coprecipitated material may also be employed, the coating structure which comprises a first alumina coating and a second silica coating thereover or the reverse structure thereof may also be adopted. Depending on the objective, the surface-treatment coating layer may be a porous layer, with homogeneity and density being generally desirable.

Specific examples of nonmagnetic powders suitable for use in the nonmagnetic layer in the present invention are: Nanotite from Showa Denko K. K.; HIT-100 and ZA-G1 from Sumitomo Chemical Co., Ltd.; α-hematite DPN-250, DPN-250BX, DPN-245, DPN-270BX, DPN-500BX, DBN-SA1 and DBN-SA3 from Toda Kogyo Corp.; titanium oxide TTO-51B, TTO-55A, TTO-5513, TTO-55C, TTO-55S, TTO-55D, SN-100, α-hematite E270, E271, E300 and E303 from Ishihara Sangyo Co., Ltd.; titanium oxide STT-4D, STT-30D, STT-30, STT-65C, and α-hematite α-40 from Titan Kogyo K. K.; MT-100S, MT-100T, MT-150W, MT-500B, MT-600B, MT-100F, and MT-500HD from Taca Corporation; FINEX-25, BF-1, BF-10, BF-20, and ST-M from Sakai Chemical Industry Co., Ltd.; DEFIC-Y and DEFIC-R from Dowa Mining Co., Ltd.; AS2BM and TiO2P25 from Nippon Aerogil; 100 A and 500 A from a Ube Industries, Ltd.; and sintered products of the same. Particular preferable nonmagnetic powders are titanium dioxide and α-iron oxide.

[Binder]

Thermoplastic resins, thermosetting resins, and reactive resins, that are conventionally known as a binder, and mixtures thereof may be employed in the magnetic layer, the nonmagnetic layer and the backcoat lager in the present invention.

The thermoplastic resins having a glass transition temperature ranging from –100 to 150° C., a number average molecular weight ranging from 1,000 to 200,000, preferably from 10,000 to 100,000, a degree of polymerization ranging from about 50 to 1,000 can be employed.

Examples of the thermoplastic resins are polymers and copolymers comprising structural units in the from of vinyl chloride, vinyl acetate, vinyl alcohol, maleic acid, acrylic acid, acrylic acid esters, vinylidene chloride, acrylonitrile, methacrylic acid, methacrylic acid esters, styrene, butadiene, ethylene, vinyl butyral, vinyl acetal, and vinyl ether; polyurethane resins; and various rubber resins.

Preferred thermosetting resins and reactive resins are those having a weight average mole weight equal to or less than 200,000 in a coating liquid. Among such resins, further preferred are those that are not softened or melted until thermal decomposition. Specific examples of thermosetting resins and reactive resins are phenol resins, epoxy resins, polyurethane cured resins, urea resins, melamine resins, alkyd resns, acrylic reactive resins, formaldehyde resins, silicone resins, epoxy polyamide resins, mixtures of polyester resins and isocyanate prepolymers, mixtures of polyester polyols and polyisocyanates, and mixtures of polyurethane and polyisocyanates.

To obtain better dispersibility and durability in all of the binders set forth above, it is desirable to introduce by copolymerization or addition reaction one or more polar groups selected from among —COOM, —SO$_3$M, —OSO$_3$M, —P=O(OM)$_2$, —O—P=O(OM)$_2$, (where M denotes a hydrogen atom or an alkali metal base), OH, NR$^1$R$^2$, N$^+$R$^1$R$^3$R$^3$ (where R$^1$ to R$^3$ denote a hydrocarbon group), epoxy groups, —SH, and —CN. If such a polar group is employed, the quantity of the polar group preferably ranges from $10^{-1}$ to $10^{-8}$ mol/g, more preferably from $10^{-2}$ to $10^{-6}$ mol/g.

These resins are described in detail in the *Handbook of Plastics* published by Asakura Shoten. It is also possible to employ electron beam-cured resins in individual layers. If employing an electron beam-cured resin, it is possible to obtain not only improved coating strength and durability but also improved surface smoothness and electromagnetic characteristics. Examples thereof and methods of manufacturing the same are described in detail in Japanese Unexamined Patent Publication (KOKAI) Showa No. 62-266219.

For example, the aforementioned binders are commercially available under the following trade names: VAGH, VYHH, VMCH, VAGF, VAGD, VROH, VYES, VYNC, VMCC, XYHL, XYSG, PKHH, PKHJ, PKHC, and PKFE from Union Carbide Corporation; MPR-TA, MPR-TA5, MPR-TAL, MPR-TSN, MPR-TMF, MPR-TS, MPR-TM, and MPR-TAO from Nisshin Kagaku Kogyo Y. K; 1000W, DX80, DX81, DX82, DX83, and 100FD from Denki Kagaku Kogyo K. K.; MM-104, MR-105, MR110, MR100, MR555, and 400X-110A from Nippon Zeon Co., Ltd.; Nippollan N2301, N2302, and N2304 from Nippon Polyurethane Co., Ltd.; Pandex T-5105, T-R3080, T-5201, Burnock D-400, D-210-80, Crisvon 6109, and 7209 from Dainippon Ink and Chemicals Incorporated.; Vylon UR8200, UR8300, UR-8700, RV530, and RV280 from Toyobo Co., Ltd.; Daipheramine 4020, 5020, 5100, 5300, 9020, 9022, and 7020 from Dainichiseika Color & Chemicals Mfg. Co., Ltd.; MX5004 from Mitsubishi Chemical Corporation; Sanprene SP-150 from Sanyo Chemical Industries, Ltd.; and Saran F310 and F210 from Asahi Chemical Industry Co., Ltd.

The above-listed resins may be used singly or in combination. Preferred resins are combinations of polyurethane resin and at least one member selected from the group consisting of vinyl chloride resin, vinyl chloride—vinyl acetate copolymers, vinyl chloride—vinyl acetate—vinyl alcohol copolymers, and vinyl chloride—vinyl acetate—maleic anhydride copolymers, as well as combinations of the same with polyisocyanate.

Known structures of polyurethane resin can be employed, such as polyester polyurethane, polyether polyurethane, polyether polyester polyurethane, polycarbonate polyurethane, polyester polycarbonate polyurethane, and polycaprolactone polyurethane.

For example, the polyurethane resins suitable for use in the present invention are commercially available under the follow trade names: UR8200, UR8300, and UR8700 from Toyobo Co., Ltd.

Examples of polyisocyanates suitable for use in the present invention are tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, triphenylmethane triisocyanate, and other isocyanates; products of these isocyanates and polyalcohols; polyisocyanates produced by condensation of isocyanates; and the like.

These isocyanates are commercially available under the following trade names, for example: Coronate L, Coronate HL, Coronate 2030, Coronate 2031, Millionate MR and Millionate MTL manufactured by Nippon Polyurethane Industry Co. Ltd.; Takenate D-102, Takenate D-110N, Takenate D-200 and Takenate D-202 manufactured by Takeda Chemical Industries Co., Ltd.; and Desmodule L Desmodule IL, Desmodule N and Desmodule HL manufactured by Sumitomo Bayer Co., Ltd. They can be used singly or in combinations of two or more in all layers by exploiting differences in curing reactivity.

The quantity of binder employed in the nonmagnetic layer, magnetic layer, or backcoat layer in the present invention falls within a range of 5 to 50 weight percent, preferably from 10 to 30 weight percent, of the nonmagnetic powder or hexagonal ferrite ferromagnetic powder. When employing vinyl chloride resin, the content in the binder can be from 5 to 30 weight percent. When employing polyurethane resin, the content of polyurethane resin can be from 2 to 20 weight percent, and the content of polyisocyanate resin can fall within a range of from 2 to 20 weight percent. Vinyl chloride resin, polyurethane resin, and polyisocyanate are desirably employed in combination from the perspective of compatibility and crosslinking. However, for example, when head corrosion occurs due to trace amounts of dechlorination, it is possible to employ polyurethane alone, or just polyurethane and isocyanate. When employing polyurethane resin in the present invention, the glass transition temperature is preferably from −50 to 150° C., more preferably from 0 to 100° C.; the elongation at break is preferably from 100 to 2,000 percent; the stress at break is preferably from 0.49 to 98 MPa (0.05 to 10 kg/mm$^2$), and the yield point is preferably from 0.49 to 98 MPa (6.05 to 10 kg/mm$^2$).

The quantity of binder; the quantity of vinyl chloride resin, polyurethane resin, polyisocyanate, or some other resin in the binder; the molecular weight of each of the resins; the quantity of polar groups; or the physical characteristics or the like of the above-described resins can naturally be different in the magnetic layer, the nonmagnetic layer, and the backcoat layer in the present invention as required These should be optimized in each layer. Known techniques for a multilayered magnetic layer may be applied. For example, when the quantity of binder is different in each layer, increasing the quantity of binder in the magnetic layer effectively decreases scratching on the surface of the magnetic layer. To achieve good head touch, the quantity of binder in the nonmagnetic layer can be increased to impart flexibility.

[Additives]

Additives may be added as needed to the magnetic layer, nonmagnetic layer, and backcoat layer in the present invention. Examples of such additives are carbon black, abrasives, lubricants, dispersion assistant agents, antimold agents, antistatic agents, antioxidants, solvents, and the like.

[Carbon Black]

Carbon black can be added to the magnetic layer, the nonmagnetic layer, and the backcoat layer in the present invention to prevent static, reduce the coefficient of friction, impart light-blocking properties, enhance film strength in the magnetic layer and the nonmagnetic layer, and the like. Examples of carbon black suitable for use are furnace black for rubber, thermal for rubber, black for coloring, and acetylene black. It is suitable for carbon black to have a specific surface area of 5 to 500 m$^2$/g, a DBP oil absorption capacity of 10 to 400 ml/100 g, a particle diameter of 5 to 300 nm (5 to 300 mµ), a pH of 2 to 10, a moisture content of 0.1 to 10 percent, and a tap density of 0.1 to 1 g/ml.

Carbon black suitable for use in the present invention are commercially available, for example, under the following trade names: BLACK PEARLS 2000, 1300, 1000, 900, 905, 800, 700 and VULCAN XC-72 from Cabot Corporation; #80, #60, #55, #50 and #35 manufactured by Asahi Carbon Co., Ltd.; #2400B, #2300, #900, #1000, #30, #40 and #10B from Mitsubishi Chemical Corporation; CONDUCTEX SC, RAVEN 150, 50, 40, 16, and RAVEN-MT-P from Columbia Carbon Co., Ltd.; and Ketjen Black EC from Nippon EC Co., Ltd. The carbon black employed may be surface-treated with a dispersant or grafted with resin, or have a partially graphite-treated surface. The carbon black may be dispersed in advance into the binder prior to addition to the magnetic coating material These carbon blacks may be used singly or in combination When employing carbon black, the quantity preferably ranges from 0.1 to 30 weight percent with respect to the weight of the hexagonal ferrite ferromagnetic powder. As described above, carbon black works to prevent static, reduce the coefficient of friction, impart light-blocking properties, enhance film strength, and the like; the properties vary with the type of carbon black employed. Accordingly, the type, quantity, and combination of carbon blacks employed in the present invention may be determined separately for the magnetic layer and the nonmagnetic layer based on the objective and the various characteristics stated above, such as particle size, oil absorption capacity, electrical conductivity, and pH, and be optimized for each layer. For example, the *Carbon Black Handbook* compiled by the Carbon Black Association may be consulted for types of carbon black suitable for use in the present invention.

[Abrasive]

In the present invention, abrasives-can be added in order to improve the durability of the magnetic layer. Known materials, chiefly with a Mohs' hardness equal to or higher than 6, such as α-alumina having an α-conversion rate equal to or higher than 90 percent, β-alumina, silicon carbide, chromium oxide, cerium oxide, α-iron oxide, corundum, artificial diamond, silicon nitride, titanium carbide, titanium oxide, silicon dioxide, and boron nitride, may be used singly or in combination as abrasives. Further, a composite comprising two or more of these abrasives (an abrasive obtained by surface-treating one abrasive with another) may also be used.

Although these abrasives may contain compounds and elements other than the main component or element in some cases, there is no change in effort so long as the main component constitutes equal to or higher than 90 percent. The particle size of these abrasives preferably ranges from 0.01 to 2 µm. In particular, in order to improve electromagnetic characteristics, narrow particle size distribution is preferred. In order to improve durability, abrasives of differing particle size may be combined as needed or the particle size distribution of a single abrasive may be broadened to achieve the same effect. A tap density of 0.3 to 2 g/mL, a moisture content of 0.1 to 5 percent, a pH of 2 to 11, and a specific surface area of 1 to 30 m$^2$/g are desirable. The abrasive may be any of acicular, spherical, or cubic in shape, but shapes that are partially angular have good abrasion properties and are thus preferred Abrasives suitable for use are commercially available, for example, under the following trade names: AKP-12, AKP-15, AKP-20, AKP-30, ARP-50, HIT-20, HIT-30, HIT-55, HIT-60, HIT-70, HIT-80 and HIT-100 from Sumitomo Chemical Co., Ltd.; ERC-DBM, HP-DBM, and HPS-DBM from Reynolds Co.; WA10000 from Fujimi Abrasives Co.; UB20 from Kamimura Kogyo Co., Ltd.; G-5, Chromex U2, and Chromex U1 from Nippon Chemical Industrial Co., Ltd.; TF100 and TF-140 from Toda Kogyo Corp.; Beta Random Ultrafine from Ibiden Co.; B-3 from Showa Mining Co., Ltd.; MD150 from Tomei Daiya Co., Ltd; and LS-600F from Lands Co., Ltd.

The above-mentioned abrasives may be added as needed to the nonmagnetic layer. By adding them to the nonmagnetic layer, it becomes possible to control the surface shape and protrusion of abrasive. The particle diameter and quantity of abrasive added to the magnetic layer and nonmagnetic layer should be set to optimal levels.

[Other Additives]

Substances having lubricating effects, antistatic effects, dispersive effects, plasticizing effects, or the like may he employed as additives in the magnetic layer and nonmagnetic layer in the present invention.

Examples of additives are: molybdenum disulfide; tungsten graphite disulfide; boron nitride; graphite fluoride; silicone oils; silicones having a polar group; fatty acid-modified silicones; fluorine-containing silicones; fluorine-containing alcohols; fluorine-containing esters; polyolefins; polyglycols; alkylphosphoric esters and their alkali metal malts; alkylsulfuric esters and their alkali metal salts; polyphenyl ethers; phenylphosphonic acid; α-naphthylphosphoric acid; phenylphosphoric acid; diphenylphosphoric acid; p-ethylbenzenephosphonic acid; phenylphosphinic acid; aminoquinones; various silane coupling agents and titanium coupling agents; fluorine-containing alkylsulfuric acid esters and their alkali metal salts; monobasic fatty acids (which may contain an unsaturated bond or be branched) having 10 to 24 carbon atoms and metal salts (such as Li, Na, K: and Cu) thereof, monohydric, dihydric, trihydric, tetrahydric, pentahydric or hexahydric alcohols with 12 to 22 carbon atoms (which may contain an unsaturated bond or be branched); alkoxy alcohols with 12 to 22 carbon atoms (which may contain an unsaturated bond or be branched); monofatty esters, difatty eaters, or trifatty esters comprising a monobasic fatty acid having 10 to 24 carbon atoms (which may contain an unsaturated bond or be branched) and any one from among a monohydric, dihydric, trihydric, tetrahydric, pentahydric or hexahydric alcohol having 2 to 12 carbon, atoms (which may contain an unsaturated bond or be branched); fatty acid esters of monoalkyl ethers of alkylene oxide polymers; fatty acid amides with 8 to 22 carbon atoms; and aliphatic amines with 8 to 22 carbon atoms.

Specific examples of the additives in the form of fatty acids are: capric acid, caprylic acid, lauric acid, myristic acid, palmitic acid, stearic acid, behenic acid, oleic acid, elaidic acid, linolic acid, linolenic acid, and isostearic acid. Examples of esters are butyl stearate, octyl stearate, amyl stearate, isooctyl stearate, butyl myristate, octyl myristate, butoxyethyl stearate, butoxydiethyl stearate, 2-ethylhexyl stearate, 2-octyldodecyl palmitate, 2-hexlydodecyl palmitate, isohexadecyl stearate, oleyl oleate, dodecyl stearate, tridecyl stearate, oleyl erucate, neopentylglycol didecanoate, and ethylene glycol dioleyl Examples of alcohols are oleyl alcohol, stearyl alcohol, and lauryl alcohol.

It is also possible to employ nonionic surfactants such as alkylene oxide-based surfactants, glycerin-based surfactants, glycidol-based surfactants and alkylphenolethylene oxide adducts; cationic surfactants such as cyclic amines, ester amides, quaternary ammonium salts, hydantion derivatives, heterocycles, phosphoniums, and sulfoniums; anionic surfactants comprising acid groups, such as carboxylic acid, sulfuric acid, phosphoric acid, sulfuric ester groups, and phosphoric ester groups; and ampholytic surfactants such as amino acids, amino sulfonic acids, summit or phosphoric esters of amino alcohols, and alkyl betaines. Details of these surfactants are described in *A Guide to Surfactants* (published by Sangyo Tosho K. K.).

These lubricants, antistatic agents aid the like need not be 100 percent pure and may contain impurities, such as isomers, unreacted material by-products, decomposition products, and oxides in addition to the man components. These impurities are preferably comprised equal to or less than 30 percent, and more preferably equal to or less than 10 percent.

The lubricants and surfactants suitable for use in the present invention each have different physical effects. The type, quantity, and combination ratio of lubricants producing synergistic effects should be optimally set for a given objective. It is conceivable to control bleeding onto the surface through the use of fatty acids having different melting points in the nonmagnetic layer and the magnetic layer; to control bleeding onto the surface through the use of esters having different boiling points, melting points, and polarity; to improve the stability of coatings by adjusting the quantity of surfactant; and to increase the lubricating effect by increasing the amount of lubricant in the intermediate layer. The present invention is not limited to these examples. Generally, a total quantity of lubricant ranging from 0.1 to 50 weight percent, preferably from 2 to 25 weight percent with respect to the hexagonal ferrite ferromagnetic powder or the nonmagnetic powder is preferred.

All or some of the additives suitable for use in the present invention may be added at any stage in the process of manufacturing the magnetic and nonmagnetic coating liquids. For example, they may be mixed with the hexagonal ferrite ferromagnetic powder before a kneading step; added during a step of kneading the ferromagnetic powder, the binder, and the solvent; added during a dispersing step; added after dispersing; or added immediately before coating. Depending on the objective, part or all of the additives may be applied by simultaneous or sequential coating after the magnetic layer has been applied to achieve a specific purpose. Depending on the objective, the lubricant may be coated on the surface of the magnetic layer after calendering or making slits.

[Organic Solvent]

Known organic solvents can be employed in the present invention. The organic solvent employed in the present invention may be used in any ratio. Examples are ketones such as acetone, methyl ethyl ketone, methyl isobutyl ketone, diisobutyl ketone, cyclohexanone, isophorone, and tetrahydrofuran; alcohols such as methanol, ethanol propanol, butanol, isobutyl alcohol, isopropyl alcohol, and methylcyclohexanol; esters such as methyl acetate, butyl acetate, isobutyl acetate, isopropyl acetate, ethyl lactate, and glycol acetate; glycol ethers such as glycol dimethyl ether, glycol monoethyl ether, and dioxane; aromatic hydrocarbons such as benzene, toluene, xylene cresol, and chlorobenzene; chlorinated hydrocarbons such as methylene chloride, ethylene chloride, carbon tetrachloride, chloroform, ethylene chlorohydrin, and dichlorobenzene; N,N-dimethylformamide; and hexane.

These organic solvents need not be 100 percent pure and may contain impurities such as isomers, unreacted materials, by-products, decomposition products, oxides and moisture in addition to the main components. The content of these impurities is preferably equal to or less than 30 percent, more preferably equal to or less than 10 percent. The amount added may be varied. To improve dispersion properties, a solvent having a somewhat strong polarity is desirable. It is desirable that solvents having a dielectric constant equal to or higher than 15 are comprised equal to or higher than 50 percent of the solvent composition. Further, the dissolution parameter is desirably 8 to 11.

[Nonmagnetic Support]

The nonmagnetic support employed in the present invention is not specifically limited Known can be employed such as polyesters such as polyethylene terephthalate and polyethylene naphthalate, polyolefins, cellulose triacetate, polycarbonates, polyamides, polyimides, polyamidoimides, polysulfones, polyaramides, aromatic polyamides, and polybenzooxazoles. Of these, the use of high-strength supports such as polyethylene naphthalate and polyamide is preferred. To change the surface roughness of the magnetic surface and the support surface, a laminated support such as those described in Japanese Unexamined Patent Publication (KOKAI) Heisei No. 3-224127 may be employed as required. These nonmagnetic supports may be subjected beforehand to corona discharge treatment, plasma treatment, adhesion-enhancing treatment, heat treatment, dust removal, or the like. Aluminum and glass substrates may be employed as the nonmagnetic support in the present invention.

To achieve the objects of the present invention, the center surface average surface roughness SRa of the nonmagnetic support as measured by the Mirau method with a TOPO-3D made by WYKO is equal to or less than 8.0 nm, preferably equal to or less than 4.0 nm, and more preferably equal to or less than 2.0 nm. Not only does such a support desirably have a low center surface average surface roughness, but there are also desirably no large protrusions equal to or higher than 0.5 μm. The surface roughness shape may be freely controlled through the size and quantity of filler added to the support as needed. Examples of such fillers are oxides and carbonates of elements such as Ca, Si, and Ti, and organic micropowders such as acrylic-based one. The support desirably has a maximum height $SR_{max}$ equal to or less than 1 μM, a ten-point average roughness $SR_z$ equal to or less than 0.5 μm, a center surface peak height $SR_p$ equal to or less than 0.5 μm, a center surface valley depth $SR_v$ equal to or less than 0.5 μm, a center-surface surface area percentage SSr of 10 percent to 90 percent, and an average wavelength $S\lambda_a$ of 5 to 300 μm. To achieve desired electromagnetic characteristics and durability, the surface protrusion distribution of the support can be freely controlled with fillers. It is possible to control within a range from 0 to 2,000 protrusions of 0.01 to 1 μm in size per 0.1 mm$^8$.

The F-5 value of the nonmagnetic support employed in the present invention desirably ranges from 49 to 490 MPa (6 to 50 kg/mm$^2$). The thermal shrinkage rate of the support after 30 min at 100° C. is preferably equal to or less than 3 percent, more preferably equal to or less than 1.5 percent. The thermal shrinkage rate after 30 min at 80° C. is preferably equal to or less than 0.5 percent, more preferably equal to or less than 0.1 percent. The breaking strength of the nonmagnetic support preferably ranges from 49 to 980 MPa (5 to 100 kg/mm$^8$). The modulus of elasticity preferably ranges from 980 to 19600 MPa (100 to 2,000 kg/mm$^2$). The thermal expansion coefficient of the nonmagnetic support preferably ranges from $10^{-4}$ to $10^{-8}$/° C., more preferably from $10^{-5}$ to $10^{-6}$/° C. The moisture expansion coefficient is preferably equal to or less than $10^{-4}$/RH percent, more preferably equal to or less than $10^{-5}$/RH percent. These thermal characteristics, dimensional characteristics, and mechanical strength characteristics are desirably nearly equal, with a difference equal to less than 10 percent, in all in-plane directions.

[Backcoat Layer]

In a tape shaped magnetic recording medium, a backcoat layer may be provided on the opposite surface of the nonmagnetic support from the surface on which is provided the magnetic layer to achieve effects such as preventing static and compensating for curl. The backcoat layer is useful for stable running of the tape-shaped magnetic recording medium. The backcoat layer normally has a thickness of about 0.1 to 1 μm, and is desirably electrically conductive. Carbon black and binder may be incorporated into the backcoat layer. The same carbon blacks and binders as described above may be employed.

The incorporation, into the backcoat layer, of metal oxides having a Mohs' hardness of 5 to 9, such as α-alumina and α-iron oxide, with an average particle size filling within a range of 100 to 210 μm, is desirable because it reduces fluctuation in the coefficient of dynamic friction between the tape guide of the recording and reproducing device or the tape guide of the loaded cassette and the backcoat layer as it slides repeatedly over it, yielding a backcoat layer with good durability. The metal oxides having a Mohs' hardness of 5 to 9 can be employed in a range of 3 to 20 weight parts per 100 weight parts of carbon black, When the light transmittance of a photosensitive layer is detected through the backcoat layer, the backcoat layer must be transparent. Accordingly, in that case, the quantity of carbon black added is desirably adjusted to conform to the light transmittance. When detecting reflectance, a reflective film such as a metal vapor deposition film, can be provided between the nonmagnetic support and the photosensitive layer.

[Layer Structure]

With respect to the thickness structure of the magnetic recording medium of the present invention, the thickness of the nonmagnetic support preferably ranges from 2 to 100 μm, more preferably from 2 to 80 μm. For computer-use magnetic recording tapes, the nonmagnetic support having a thickness of 3.0 to 6.5 μm, preferably 3.0 to 6.0 μm, more preferably 4.0 to 5.5 μm is suitably employed.

The thickness of the magnetic layer is equal to or less than 0.2 μm, preferably from 0.03 to 0.15 μm. The rate of variation in thickness of the magnetic layer is preferably within ±20 percent, more preferably within ±5 percent. It is also possible to separate the magnetic layer into two or more layers having different magnetic characteristics, and to suitably employ configurations relating to known multilayer magnetic layers.

When a nonmagnetic layer is provided on a nonmagnetic support, the nonmagnetic layer preferably has a thickness ranging from 0.2 to 5.0 μm, more preferably from 0.3 to 3.0 μm, further preferably from 1.0 to 2.5 μm.

The nonmagnetic layer in the present invention is effective so long as it is substantially nonmagnetic For example, it exhibits the effect of the present invention even when it comprises impurities or trace amounts of magnetic material that have been intentionally incorporated, and can be viewed as substantially having the same configuration as the present invention. The term "substantially nonmagnetic" is used to mean having a residual magnetic flux density in the nonmagnetic layer of equal to or less than 50 T·m (500 G), or a coercive force (Hc) of equal to or less than 39.8 kA/m (500 Oe), it being preferable not to have a residual magnetic flux density or coercive force at all.

An undercoating layer for improving adhesion between the nonmagnetic support and the nonmagnetic layer or magnetic layer may be provided. The thickness of the undercoating layer preferably ranges from 0.01 to 0.5 µm, more preferably from 0.02 to 0.5 µm. When a backcoat layer is provided, the thickness thereof preferably ranges from 0.1 to 4 µm, more preferably from 0.3 to 2.0 µm.

The magnetic recording medium of the present invention may be a disk-shaped medium with double-sided magnetic layers in which a nonmagnetic layer and magnetic layer are provided on both sides of the nonmagnetic support, or may be a tape-shaped or disk-shaped magnetic recording medium having these layers on just one side.

[Physical Properties]

The saturation magnetic flux density of the magnetic layer in the magnetic recording medium of the present invention preferably ranges from 100 to 300 T·m (1,000 to 3,000 G). The coercive force (Hc) of the magnetic layer preferably ram from 143 to 398 kA/m (1,800 to 5,000 Oe), more preferably from 167 to 279 kA/m (2,100 to 3,500 Oe). A narrow coercive force distribution is desirable, with the SFD and SFDr being equal to or leas than 0.6, preferably equal to or less than 0.2.

In tape-shaped magnetic recording media, the squareness (SQ) is preferably equal to or greater than 0.6 because output increases. Although the SQ is not specifically limited, a value equal to or less than 0.90 is desirable because noise decreases due to prevention of hexagonal ferrite ferromagnetic powders from stacking. When random orientation is imparted in disk-shaped magnetic recording media, the SQ is preferably from 0.45 to 0.65, and the SQ is preferably rendered isotropic within the disk. When imparting circumferential orientation, the SQ is preferably equal to or greater than 0.6 in a circumferential direction in the same manner as in tape-shaped magnetic recording media.

The coefficient of friction of the magnetic recording medium of the present invention relative to the head is preferably equal to or less than 0.5 and more preferably equal to or less than 0.3 at temperatures ranging from −10° C. to 40° C. and humidity ranging from 0 percent to 95 percent, the specific surface resistivity preferably ranges from $10^4$ to $10^{12}$ Ω/sq on the magnetic surface, and the charge potential preferably ranges from −500 V to +500 V. The modulus of elasticity at 0.5 percent extension of the magnetic layer preferably ranges from 980 to 19600 MPa (100 to 2,000 kg/mm$^2$) in each in-plane direction. The breaking strength preferably ranges from 98 to 686 MPa (10 to 70 kg/mm$^2$). The modulus of elasticity of the magnetic recording medium preferably ranges from 980 to 14700 MPa (100 to 1,500 kg/mm$^8$) in each in-plane direction. The residual elongation is preferably equal to or less than 0.6 percent, and the thermal shrinkage rate at all temperatures below 100° C. is preferably equal to or less than 1 percent, more preferably equal to or less than 0.5 percent, and most preferably equal to or less than 0.1 percent, The glass transition temperature (i.e., the temperature at which the loss elastic modulus of dynamic viscoelasticity peaks as measured at 110 Hz) of the magnetic layer is preferably 50 to 120° C., and that of the nonmagnetic layer preferably ranges from 0 to 100° C. The loss elastic modulus preferably falls within a range of $1 \times 10^7$ to $8 \times 10^8$ Pa ($1 \times 10^8$ to $8 \times 10^9$ dyne/cm$^2$) and the loss tangent is preferably equal to or less than 0.2. Adhesion failure tends to occur when the loss tangent becomes excessively large. These thermal characteristics and mechanical characteristics are desirably nearly identical, varying by 10 percent or less, in each in-plane direction of the medium. The residual solvent in the magnetic layer is preferably equal to or less than 100 mg/m$^2$ and more preferably equal to or less than 10 mg/m$^2$. The void ratio in the coated layers, including both the nonmagnetic lower layer and the magnetic layer, is preferably equal to or less than 30 volume percent, more preferably equal to or less than 20 volume percent. Although a low void ratio is preferable for attaining high output, there are some cases in which it is better to ensure a certain level based on the object. For example, in many cases, larger void ratio permits preferred running durability in disk media in which repeat use is important.

The center surface average surface roughness Ra of the magnetic layer as measured by Mirau method with a TOPO-3D is preferably equal to or less than 4.0 nm, more preferably equal to or less than 3.0 nm, and still more preferably equal to or less than 2.0 nm. Preferably, the maximum height of the magnetic layer, $SR_{max}$, is equal to or less than 0.5 µm; the ten-point average roughness $SR_s$ is equal to or less than 0.3 µm; the center surface peak height $SR_p$ is equal to or less than 0.3 µm, the center surface valley depth $SR_v$ equal to or less than 0.3 µm, the center surface area percentage $SS_r$ ranges from 20 to 80 percent, and the average wavelength S λ a ranges from 5 to 300 µm. The number of surface protrusions in the magnetic layer measuring from 0.01 µm to 1 µm in size is preferably set to within a range of 0 to 2,000, thereby electromagnetic characteristics and the coefficient of friction are preferably optimized. These can be easily controlled by varying surface properties with fillers in the support, as well as by the particle diameter and quantity of powders added to the magnetic layer, the surface shape of the rollers employed in calendering and the like. Curling is preferably within ±3 mm.

It will be readily deduced that the physical properties of the nonmagnetic layer and magnetic layer may be varied based on the objective in the magnetic recording medium of the present invention. For example, the modulus of elasticity of the magnetic layer may be increased to improve running durability while simultaneously employing a lower modulus of elasticity than that of the magnetic layer in the nonmagnetic layer to improve the head contact of the magnetic recording medium.

[Manufacturing Method]

The process for manufacturing the coating material for magnetic layer of the magnetic recording medium of the present invention comprises at least a kneading step, a dispersing step, and a mixing step to be carried out, if necessary, before and/or after the kneading and dispersing steps. Each of the individual steps may be divided into two or more stages. Ail of the starting materials employed in the present invention, including the magnetic material, nonmagnetic powder, binders, carbon black, abrasives, antistatic agents, lubricants, solvents, and the like, may be added at the beginning of or during, any of the steps. Moreover, the individual starting materials may be divided up and added during two or more steps. For example, polyurethane may be divided up and added in the kneading step, the dispersion step, and the mixing step for viscosity adjustment after dispersion. To achieve the object of the present invention, conventionally known manufacturing techniques may be utilized or some of the steps.

A kneader having a strong kneading force, such as an open kneader, continuous kneader, pressure kneader, or extruder is preferably employed in the kneading step. When a kneader is employed, the hexagonal ferrite ferromagnetic powder or nonmagnetic powder and all or part of the binder (preferably equal to or higher than 30 percent of the entire quantity of binder) are kneaded in a range of 16 to 500 weight parts per 100 weight parts of the ferromagnetic powder. Details of the kneading process are described in Japanese Unexamined Patent Publication (KOKAI) Heisei Nos. 1-1068338 and 1-79274. Further, glass beads may be employed to disperse the coating liquid for magnetic layer and the coating liquid for nonmagnetic layer, with a dispersing medium with a high specific gravity such as zirconia beads, titania beads, and steel beads being suitable for use. The particle diameter and fill ratio of these dispersing media are optimized for use. A known dispersing device may be employed.

Methods such as the following are desirably employed when coating a multilayer-structured magnetic recording medium in the present invention;

(1) A method in which the nonmagnetic layer is first applied with a coating device commonly employed to apply magnetic coating materials such as a gravure coating, roll coating, blade coating, or extrusion coating device, and the magnetic layer is applied while the nonmagnetic layer is still wet by means of a support pressure evasion coating device such as is disclosed in Japanese Examined Patent Publication (KOKOKU) Heisei No. 1-46186 and Japanese Unexamined Patent Publication KOKAI) Showa No. 60-288179 and Japanese Unexamined Patent Publication (KOKAI) Heisei No. 2-265672;

(2) A method in which the upper and lower layers are applied nearly simultaneously by a single coating head having two built-in slits for passing coating liquid, such as is disclosed in Japanese Unexamined Patent Publication (KOKAI) Showa No. 63-88080, Japanese Unexamined Patent Publication (KOKAI Heisei No. 2-17971, and Japanese Unexamined Patent Publication (KOKAI) Heisei No. 2-265672; and (3) A method in which the magnetic and nonmagnetic layers are applied nearly simultaneously using an extrusion coating apparatus with a backup roller as disclosed in Japanese Unexamined Patent Publication (KOKAI) Heisei No. 2-174965.

To avoid deteriorating the electromagnetic characteristics or the like of the magnetic recording medium by aggregation of magnetic particles, shear is desirably imparted to the coating liquid in the coating head by a method such as disclosed in Japanese Unexamined Patent Publication (KOKAI) Showa No. 62-95174 or Japanese Unexamined Patent Publication (KOKAI) Heisei No. 1-23968. In addition, the viscosity of the coating liquid must satisfy the numerical range specified in Japanese Unexamined Patent Publication (KOKAI) Heisei No. 8-8471.

Applying the nonmagnetic layer, drying it, and then applying the magnetic layer thereover in a sequential multilayer coating to achieve the structure of the present invention is also possible, and does not compromise the effect of the present invention. However, to reduce the number of voids in the coating and improve the quality as regards dropout and the like, the above-describe simultaneous multilayer coating is preferred.

In disk-shaped magnetic recording media, it is sometimes possible to achieve adequately isotropic orientation without conducting orientation with an orienting device. However, the use of a known random orientation device in which cobalt magnets are reciprocally positioned at an angle and an alternating current is applied with a solenoid is preferred. In the case of hexagonal ferrite ferromagnetic powder, it is generally easy to achieve in-plane and vertical three-dimensional randomness, but in-plane two-dimensional randomness is also possible. Further, circumferential orientation may also be imparted by spin coating.

In tape-shaped magnetic recording media, cobalt magnets and solenoids are employed to impart orientation in the longitudinal direction The temperature and flow volume of the drying air, and coating rate are desirably controlled to control the drying position of the coating. The coating rate preferably ranges from 20 to 1,000 m/min, and the temperature of the drying is preferably equal to or higher than 60° C. It is also possible to conduct suitable predrying prior to entering the magnet zone.

Processing may be conducted with calender rolls in the form of heat-resistant plastic rolls such as epoxy, polyimide, polyamide, and polyimidoamide, or metal rolls. When forming two-surface magnetic layers, treatment with metal rolls is particularly desirable. The processing temperature is preferably equal to or higher than 50° C., more preferably equal to or higher than 100° C. The linear pressure is preferably equal to or higher than 200 kg/cm, more preferably equal to or higher than 300 kg/cm.

Processing the surface of a tape-shaped or disk-shaped magnetic recording medium with an abrasive tape covered with a substance such as alumina, chromium oxide, or diamond is desirable to remove protrusions and foreign matter.

As we have continued to evolve into a multimedia society, the need to record images has grown stronger not just in the industrial world, but also in households. The magnetic recording medium of the present invention adequately meets the requirements of image recording media with respect to functions and costs, in addition to data such as simple text and numbers.

The magnetic recording medium of the present invention can be suitably employed in magnetic recording and preproducing systems using magnetoresistive (MR) reproduction heads. The type of MR head is not specifically limited; both GMR an TMR heads may be employed. Although the head employed or recording is not specifically limited, a saturation magnetization level of equal to or greater than 1.2 T is desirable, with equal to or greater than 2.0 T being further preferred.

The magnetic recording medium of the present invention is suited to use in computer data recording.

EMBODIMENTS

The specific examples of the present invention will be described below. However, the present invention is not limited to the examples. Further, the "parts" given in the embodiments are weight parts unless specifically stated otherwise.

Embodiment 1

Preparation of Coating Materials for Magnetic Layer and Nonmagnetic Layer

Barium ferrite magnetic powders shown in Table 1 below were employed in the coating liquid for magnetic layer.

TABLE 1

| Magnetic powder | Average plate diameter (nm) | Average plate thickness (nm) | Coercive force (Hc) (kA/m(Oe)) | Saturation magnetization (σs) (A · m²/kg) |
|---|---|---|---|---|
| A | 18 | 6 | 167.2(2100) | 49 |
| B | 25 | 8 | 183.1(2300) | 50 |
| C | 30 | 10 | 179.1(2250) | 54 |
| D | 35 | 10 | 180.7(2270) | 53 |
| E | 40 | 13 | 186.3(2840) | 55 |
| F | 50 | 10 | 180.7(2270) | 56 |
| G | 70 | 11 | 184.7(2320) | 56 |

| <Composition of magnetic layer coating material> | |
| --- | --- |
| Barium ferrite magnetic powder | 100 parts |
| Polyurethane resin | |
| UR8200 (manufactured by Toyobo Co., Ltd.) | 8 parts |
| UR8300 (manufactured by Toyobo Co., Ltd.) | 4 parts |
| α-alumina | 4 parts |
| HIT55 (manufactured by Sumitomo Chemical Co., Ltd.) | |
| Diamond | 1 part |
| MD150 (manufactured by Tomei Daiya Co., Ltd.) | |
| Carbon black | 1 part |
| #50 (manufactured by Asahi Carbon Co., Ltd.) | |
| Phenylphosphorous acid | 1 part |
| Butyl stearate | 10 parts |
| Butoxyethyl stearate | 5 parts |
| Isohexadecyl stearate | 3 parts |
| Stearic acid | 2 parts |
| Methyl ethyl ketone | 125 parts |
| Cyclohexanone | 125 parts |
| <Composition of nonmagnetic layer coating material> | |
| Nonmagnetic powder α-$Fe_2O_3$ hematite | 80 parts |
| Major axis length: 0.08 μm | |
| Specific surface area by BET method: 60 $m_2$/g | |
| pH: 9 | |
| Surface treatment agent: $Al_2O_3$, 8 weight percent | |
| Carbon black | 15 parts |
| CONDUCTEX SC-U (manufactured by Columbia Carbon Co., Ltd.) | |
| Polyurethane resin | |
| UR8200 (manufactured by Toyobo Co., Ltd.) | 12 parts |
| UR8300 (manufactured by Toyobo Co., Ltd.) | 6 parts |
| Phenylphosphorous acid | 3 parts |
| Butyl stearate | 8 parts |
| Butoxyethyl stearate | 5 parts |
| Isohexadecyl stearate | 2 parts |
| Stearic acid | 3 parts |
| Methyl ethyl ketone/cyclohexanone mixed solvent at 8/2 | 250 parts |

Manufacturing the Magnetic Recording Medium

Each component of the above-described magnetic layer coating material and nonmagnetic layer coating material was charged to kneaders and kneaded, and then dispersed in sand mills. Polyisocyanate was added to the dispersions obtained in the follow proportions: 10 parts to the nonmagnetic layer coating material and 10 parts to the magnetic layer coating material. To each were further added 40 parts of cyclohexanone. The mixtures were filtered with a filter having 1 μm average pore diameter to complete the preparation of coating liquids for magnetic layer and nonmagnetic layer.

The nonmagnetic layer coating material obtained was applied in a quantity calculated to yield a dry thickness of 1.5 μm on a polyethylene naphthalate support with a thickness of 62 μm and a center surface average surface roughness of 1.8 nm, and dried. Immediately thereafter, a blade method was employed to apply the magnetic layer coating material over the nonmagnetic layer in such a manner as to yield a magnetic layer of prescribed thickness. The product was passed through two field intensity alternating current magnetic field generating devices with a frequency of 50 Hz and a magnetic field intensity of 25 T·m (250 Gauss) and 50 Hz, 12 T·m (120 Gauss), respectively to impart random orientation. Following drying, the product was processed with a seven-stage calender at 90° C. and a linear pressure of 300 kg/cm, punched to 3.7 inches, and the surface was polished. After punching to disk shape, the disks were thermo-treated at 70° C. and burnished with an abrasive tape to promote hardening of the coated surface.

Embodiments 2 to 17

With the exceptions that the thickness of the magnetic layer and the recording track width in Embodiment 1 were changed, magnetic recording media were prepared by the same method as in Embodiment 1.

COMPARATIVE EXAMPLES 1 TO 14

With the exceptions that the average plate diameter of the barium ferrite magnetic powder and the thickness of the magnetic layer in Embodiment 1 were changed, magnetic recording media were prepared by the same method as in Embodiment 1.

<Evaluation of the Magnetic Recording Media>

The characteristics of the magnetic recording media obtained in the Embodiments and Comparative Examples were measured by the methods indicated below.

(1) Magnetic Characteristics (Hc, σs)

Measurements were performed at Hm of 796 kA/m (10 KOe) with a vibrating sample magnetometer (made by Toei Kogyo).

(2) Plate Diameter and Plate Thickness of Barium Ferrite

Five hundred particles were randomly measured by TEM photography and the average value was calculated.

(3) Magnetic Layer Thickness

The magnetic recording medium was cut to a thickness of about 0.1 μm in a radial direction with a diamond cutter, observed with a transmission electron microscope at a magnification of 10,000 to 100,000 fold, preferably 20,000 to 50,000 fold, and a photograph was taken. The difference in shape of the ferromagnetic powder and nonmagnetic power in the magnetic layer and nonmagnetic layers, respectively, was noted, and the interface was visually evaluated to measure the thickness of the magnetic layer.

(4) S/N Ratio

Each of the above-described disk samples was set on a spin stand on which a head had been mounted and the rotational speed was adjusted to achieve a speed of the medium relative to the head at a measured radial position of 4 m/s. A 20 MHz rectangular wave signal was then recorded on the disk with an inductive head and reproduced with an AMR head. The signal output was measured, noise falling within a range of 0 to 40 MHz was integrated, and the ratio was adopted as the S/N ratio.

The characteristics of the magnetic disks obtained in (1) through (4) are given in Table 2.

TABLE 2

| No. | Type of magnetic powder | Average plate diameter X of magnetic powder (nm) | Magnetic layer thickness Y (nm) | Recording track width Z (nm) | Y/X | Z/X | SN ratio (dB) | Hc of magnetic layer (kA/m(Oe)) |
|---|---|---|---|---|---|---|---|---|
| Embodiment 1 | A1 | A | 18 | $2.0 \times 10^2$ | $2.0 \times 10^3$ | 11 | 111 | 27 | 167(2100) |
| Embodiment 2 | A2 | B | 25 | $2.0 \times 10^2$ | $2.0 \times 10^3$ | 8.0 | 80 | 28 | 183(2300) |
| Embodiment 3 | A3 | C | 30 | $2.0 \times 10^2$ | $2.0 \times 10^3$ | 6.7 | 67 | 27 | 179(2250) |
| Embodiment 4 | A4 | D | 35 | $2.0 \times 10^2$ | $2.0 \times 10^3$ | 5.7 | 57 | 26 | 181(2270) |
| Embodiment 5 | A5 | E | 40 | $2.0 \times 10^2$ | $2.0 \times 10^3$ | 6.0 | 50 | 24 | 186(2340) |
| Embodiment 6 | A6 | F | 50 | $2.0 \times 10^2$ | $2.0 \times 10^3$ | 4.0 | 40 | 22 | 181(2270) |
| Comp. Ex. 1 | B1 | G | 70 | $2.0 \times 10^2$ | $2.0 \times 10^3$ | 2.9 | 29 | 14 | 185(2320) |
| Embodiment 7 | A7 | A | 18 | $0.8 \times 10^2$ | $2.0 \times 10^3$ | 4.4 | 111 | 26 | 167(2100) |
| Embodiment 8 | A8 | B | 25 | $0.8 \times 10^2$ | $2.0 \times 10^3$ | 3.2 | 80 | 28 | 183(2300) |
| Embodiment 9 | A9 | C | 30 | $0.8 \times 10^2$ | $2.0 \times 10^3$ | 2.7 | 67 | 26 | 179(2250) |
| Embodiment 10 | A10 | D | 35 | $0.8 \times 10^2$ | $2.0 \times 10^3$ | 2.3 | 57 | 24 | 181(2270) |
| Embodiment 11 | A11 | E | 40 | $0.8 \times 10^2$ | $2.0 \times 10^3$ | 2.0 | 50 | 22 | 186(2340) |
| Comp. Ex. 2 | B2 | F | 50 | $0.8 \times 10^2$ | $2.0 \times 10^3$ | 1.6 | 40 | 16 | 181(2270) |
| Embodiment 12 | A12 | A | 18 | $0.8 \times 10^2$ | $1.0 \times 10^3$ | 4.4 | 56 | 24 | 167(2100) |
| Embodiment 13 | A13 | B | 25 | $0.8 \times 10^2$ | $1.0 \times 10^3$ | 8.2 | 40 | 25 | 183(2800) |
| Embodiment 14 | A14 | C | 80 | $0.8 \times 10^2$ | $1.0 \times 10^3$ | 2.7 | 33 | 23 | 179(2250) |
| Comp. Ex. 3 | B3 | D | 35 | $0.8 \times 10^2$ | $1.0 \times 10^3$ | 2.3 | 29 | 17 | 181(2270) |
| Comp. Ex. 4 | B4 | E | 40 | $0.8 \times 10^2$ | $1.0 \times 10^3$ | 2.0 | 25 | 15 | 186(2840) |
| Comp. Ex. 5 | B5 | F | 50 | $0.8 \times 10^2$ | $1.0 \times 10^3$ | 1.6 | 20 | 10 | 181(2270) |
| Embodiment 15 | A15 | A | 18 | $0.5 \times 10^2$ | $1.0 \times 10^3$ | 2.7 | 56 | 23 | 167(2100) |
| Embodiment 16 | A16 | B | 25 | $0.5 \times 10^2$ | $1.0 \times 10^3$ | 2.0 | 40 | 23 | 183(2800) |
| Comp. Ex. 6 | B6 | C | 30 | $0.5 \times 10^2$ | $1.0 \times 10^3$ | 1.7 | 33 | 17 | 179(2250) |
| Comp. Ex. 7 | B7 | D | 35 | $0.5 \times 10^2$ | $1.0 \times 10^3$ | 1.4 | 29 | 15 | 181(2270) |
| Comp. Ex. 8 | B8 | E | 40 | $0.5 \times 10^2$ | $1.0 \times 10^3$ | 1.8 | 25 | 12 | 186(2840) |
| Comp. Ex. 9 | B9 | F | 50 | $0.5 \times 10^2$ | $1.0 \times 10^3$ | 1.0 | 20 | 8 | 181(2270) |
| Embodiment 17 | A17 | A | 18 | $0.8 \times 10^2$ | $0.6 \times 10^3$ | 4.4 | 33 | 22 | 167(2100) |
| Comp. Ex. 10 | B10 | B | 25 | $0.8 \times 10^2$ | $0.6 \times 10^3$ | 3.2 | 24 | 17 | 183(2300) |
| Comp. Ex. 11 | B11 | C | 30 | $0.8 \times 10^2$ | $0.6 \times 10^3$ | 2.7 | 20 | 16 | 179(2250) |
| Comp. Ex. 12 | B12 | D | 35 | $0.8 \times 10^2$ | $0.6 \times 10^3$ | 2.8 | 17 | 14 | 181(2270) |
| Comp. Ex. 13 | B13 | E | 40 | $0.8 \times 10^2$ | $0.6 \times 10^3$ | 2.0 | 15 | 11 | 186(2840) |
| Comp. Ex. 14 | B14 | F | 50 | $0.8 \times 10^2$ | $0.6 \times 10^3$ | 1.6 | 12 | 8 | 181(2270) |

Table 2 reveals that when the average plate diameter (X of barium ferrite magnetic powder was ½ or less of the magnetic layer thickness (Y), that is, when the ratio of Y/X was equal to or greater than 2, as well as when the average plate diameter (X) was 1/30 or less of the recording track width (Z), that is, when the ratio of Z/X was equal to or greater than 30, a good S/N ratio of equal to or greater than 20 dB was achieved (Embodiments 1 to 17).

By contrast, when the ratio of Y/X was less than 2 (Comparative Examples 2, 6), the ratio of Z/X was less than 30 (Comparative Examples 1, 3, 4, 10 to 13), or the ratio of Y/X was less than 2 and the ratio of Z/X was less than 30 (Comparative Examples 5, 7 to 9, 14), the S/N ratio dropped sharply and an S/N ratio of less than 20 dB was obtained (Comparative Examples 1 to 14).

From these results, it can be understood that god electromagnetic characteristics are obtained when the average plate diameter of barium ferrite is 1/30 or less of the recording track width and is ½ or less of the magnetic layer thickness.

In the magnetic recording medium of the present invention as set forth above, the average plate diameter of the hexagonal ferrite ferromagnetic powder employed in the magnetic layer is set to 1/30 or less of the recording track width and ½ or less of the magnetic layer thickness. Thus, the present invention provides a magnetic recording medium exhibiting good electromagnetic characteristics in high-density recording.

The present disclosure relates to the subject matter contained in Japanese Patent Application No. 2003-15601 filed on Jan. 24, 2003, which is expressly incorporated herein by reference in its entirety.

What is claimed is:

1. A method of magnetically recording signals on a magnetic recording medium and reproducing the magnetically recorded signals with a magnetoresistive magnetic head, wherein said signals are magnetically recorded with a track width of 0.5 μm to 2.0 μm, said magnetic recording medium comprises a magnetic layer comprising a hexagonal ferrite ferromagnetic powder and a binder on a nonmagnetic support, said magnetic layer has a thickness equal to or less than 0.2 μm, and said hexagonal ferrite ferromagnetic powder has an average plate diameter of 1/30 or less of the magnetically recorded track width as well as ½ or less of the thickness of the magnetic layer.

2. The method of claim 1, wherein said magnetic recording medium further comprises a non-magnetic layer comprising a non-magnetic powder and a binder.

3. The method of claim 1, wherein the bit length of the magnetically recorded signals ranges from 0.04 to 0.12 μm.

4. The method of claim 2, wherein the bit length of the magnetically recorded signals ranges from 0.04 to 0.12 μm.

5. A method according to claim 1, wherein the magnetic layer has a coercive force ranging from 1800 to 5,000 Oe.

6. A method according to claim 2, wherein the magnetic layer has a coercive force ranging from 1800 to 5,000 Oe.

7. The method according to claim 1, wherein the magnetic layer has a squareness (SQ) equal to or higher than 0.6.

8. The method according to claim 2, wherein the magnetic layer has a squareness (SQ) equal to or higher than 0.6.

9. In an apparatus comprising a magnetic head and a magnetic recording medium having magnetically recorded signals, the improvement wherein:

the magnetic head is a magnetoresistive head, the magnetoresistive magnetic head reproduces magnetically recorded signals with a track width of 0.5 µm to 2.0 µm, said magnetic recording medium comprises a magnetic layer comprising a hexagonal ferrite ferromagnetic powder and a binder on a nonmagnetic support, said magnetic layer has a thickness equal to or less than 0.2 µm, and said hexagonal ferrite ferromagnetic powder has an average plate diameter of 1/30 or less of the magnetically recorded track width as well as 1/2 or less of the thickness of the magnetic layer.

10. The apparatus according to claim 9, wherein said magnetic recording medium further comprises a non-magnetic layer comprising a non-magnetic powder and a binder.

11. The apparatus according to claim 9, wherein the bit length of the magnetically recorded signals ranges from 0.04 to 0.12 µm.

12. The apparatus according to claim 10, wherein the bit length of the magnetically recorded signals ranges from 0.04 to 0.12 µm.

13. The apparatus according to claim 9, wherein the magnetic layer has a coercive force ranging from 1800 to 5000 Oe.

14. The apparatus according to claim 10, wherein the magnetic layer has a coercive force ranging from 1800 to 5000 Oe.

15. The apparatus according to claim 9, wherein the magnetic layer has a squareness (SQ) equal to or higher than 0.6.

16. The apparatus according to claim 10, wherein the magnetic layer has a squareness (SQ) equal to or higher than 0.6.

* * * * *